United States Patent Office 3,524,798
Patented Aug. 18, 1970

3,524,798
STABILIZATION OF ALPHA-AMYLASE
PREPARATIONS
Norman E. Lloyd, Robert E. Lodge, and Robert A. Wynes, Clinton, Iowa, assignors to Standard Brands Incorporated, New York, N.Y., a corporation of Delaware
No Drawing. Continuation-in-part of application Ser. No. 422,425, Dec. 30, 1964. This application May 23, 1967, Ser. No. 640,489
Int. Cl. C07g 7/02
U.S. Cl. 195—63      8 Claims

ABSTRACT OF THE DISCLOSURE

High levels of calcium acetate, calcium formate, calcium propionate, and calcium lactate in alpha-amylase preparations provide a significant degree of storage stability to the alpha-amylase. These salts may be incorporated into alpha-amylase preparation during defecation, after defecation, or after the alpha-amylase preparation is concentrated.

---

This application is a continuation-in-part of our application Ser. No. 422,425 filed Dec. 30, 1964, now abandoned.

This invention relates to novel alpha-amylase preparations. More particularly, the present invention relates to alpha-amylase preparations containing high levels of calcium and methods of preparing the same.

A primary use of bacterial alpha-amylase preparations is in the desizing of textiles. Textiles, for instance, cotton threads, are sized with a dilute solution of starch which coats them and makes them resistant to the tensile shock and abrasion which occur when they are woven. The starch coating is then removed from the threads by desizing with dilute solutions of bacterial alpha-amylase at relatively high temperatures, typically in the range of from 160 to 212° F. Bacterial alpha-amylase at these temperatures will be inactivated in a very short period of time; and, to impart some degree of thermostability to the alpha-amylase, it has been the practice to provide small or trace amounts of soluble calcium salts in the desizing bath. The calcium salts may be incorporated into the desizing bath when the bath is prepared by the textile manufacturer, but usually the necessary calcium is provided in the alpha-amylase preparation when such preparations are freshly prepared.

Various calcium salts have been used for this purpose and probably the most widely used salt heretofore has been calcium chloride. The levels of salts used in the desizing baths are extremely small and are sometimes referred to as trace amounts. At such low levels the various calcium salts impart essentially the same degree of thermostability to alpha-amylase.

Surprisingly, we have discovered that in alpha-amylase preparations certain calcium salts in high concentrations are far superior to others in terms of their effect on storage stability for such alpha-amylase preparations. In fact, it has been found that some calcium salts at high levels are actually detrimental to the storage stability of alpha-amylase preparations. Particularly, we have discovered that in alpha-amylase preparations levels of calcium formate, calcium acetate, calcium propionate, and calcium lactate sufficient to provide calcium concentration in the range of above about one percent provide a significant degree of storage stability to the alpha-amylase while salts such as calcium chloride, calcium nitrate, and calcium chloroacetate do not. Preferably, the total amount of calcium present is in the range of from above about one percent to above five percent.

The preparation of bacterial alpha-amylas for desizing is well known in the art and includes providing a fermentation broth of B. subtilis at ambient temperature, defecating the preparation and adding a preservative such as borax, ammonium sorbate, and the like. In this unconcentrated alpha-amylase preparation low levels of calcium may be provided in order to impart thermostability to the alpha-amylase when such preparation is to be used in desizing.

A preferred method of our invention includes defecating the alpha-amylase preparation by the use of a soluble calcium salt which coagulates the bacilli into a filterable mass and precipitates any of the sulfate, phytate, and phosphate ions which might have been added during the fermentation. When calcium chloride is used for defecation the amount used is limited to substantially that required to precipitate all the constituents of the broth which are precipitated by the calcium plus a slight excess. But the amount of calcium chloride should not be greater than that which provides greater than one percent by weight of calcium in the defecated alpha-amylase preparation. At levels which provide above one percent calcium the calcium chloride reduces the stability of the alpha-amylase. Salts other than calcium chloride may be also used to defecate the enzyme broth. The calcium salts of the present invention; namely, the lactate, propionate, acetate, and formate, may be used in amounts in large excess of that required for defecation. Preservatives such as borax, ammonium sorbate, and the like may be incorporated into the broth and the pH adjusted as required, for example, with ammonium hydroxide or dilute hydrochloric acid, to a pH range of preferably from about 6 to about 6.5. The broth is then clarified by filtration or centrifugation and concentrated to the desired potency while maintaining the pH of the broth in the pH range of about 5.2 to about 6.0 and preferably from about 5.6 to about 5.8. Usually, the potency of the concentrate will be above about 3000 liquefons per gram, and typically in the range of from about 8000 to about 12000 liquefons per gram.

The term liquefon is defined as the amount of enzyme which will dextrinize 0.351 mg. of starch per minute at 30° C. and a pH of 6.2 in a 30 milliliter test solution containing 400 mg. of starch and is calculated using the following formula:

$$\text{liquefons/g.} = \frac{1140}{\text{Weight (g.) of enzyme} \times \text{time (min.)}}$$

The method used is a modification of that adapted by the American Association of Textile Chemists (AATC) published in the America Dyestuff Reporter, July 9, 1962. The modifications of the published method are as follows:

(1) The buffer for the substrate was prepared by dissolving 25.3 g. of C.P. sodium hydroxide and 340 g. of potassium dihydrogen phosphate in water and diluting to 2 liters. The pH of the buffer was 6.2,
(2) 125 ml. of the buffer was added to the substrate before the substrate was brought to the necessary volume,
(3) and 20 ml. of the substrate and 10 ml. of the enzyme solution were used per determination.

The calcium salts of the present invention, in amounts to achieve levels of above about one percent calcium based on the weight of the alpha-amylase concentrate, may be incorporated into either the dilute enzyme broth or in the concentrated enzyme preparation. In the case where the salts are incorporated into the enzyme broth, an excess must be used to achieve the desired level since a portion of the calcium will be precipitated during defecation. Solutions of these salts may be used for this purpose ing a sufficient amount of calcium chloride dihydrate thereto to achieve the levels shown in Table I. These

TABLE I.—EFFECTS OF CALCIUM CHLORIDE ON THE STABILITY ALPHA-AMYLASE

| Sample | Calcium, g./100 g. | pH Start | pH After 28 days at 100° F. | Activity before storage, liquefons/g. | Stability, percent activity remaining after 28 days at 100° F. |
|---|---|---|---|---|---|
| No. 1 | 0.01 | 5.7 | 4.7 | 4,210 | 28 |
| Concentrates of Sample 1: | | | | | |
| A | 0.03 | 5.7 | 5.4 | 7,260 | 93 |
| B | 0.03 | 5.7 | 5.4 | 8,910 | 92 |
| C | 0.04 | 5.7 | 5.4 | 11,570 | 91 |
| D | 0.07 | 5.7 | 5.2 | 22,320 | 87 |
| No. 2 | 0.70 | 5.7 | 4.6 | 3,960 | 45 |
| Concentrates of Sample 2: | | | | | |
| A | 1.39 | 5.7 | 5.4 | 7,420 | 87 |
| B | 1.79 | 5.7 | 5.3 | 9,960 | 84 |
| C | 2.22 | 5.7 | 5.4 | 13,110 | 84 |
| D | 2.81 | 5.7 | 5.4 | 17,590 | 76 |
| No. 3 | 1.25 | 5.7 | 4.9 | 3,870 | 74 |
| Concentrates of Sample 3: | | | | | |
| A | 2.60 | 5.7 | 5.4 | 7,560 | 79 |
| B | 3.27 | 5.7 | 5.4 | 10,110 | 69 |
| C | 4.10 | 5.7 | 5.5 | 12,900 | 30 |
| No. 4 | 1.79 | 5.7 | 5.6 | 3,750 | 73 |
| Concentrates of Sample 4: | | | | | |
| A | 3.79 | 5.7 | 5.4 | 7,880 | 45 |
| B | 4.83 | 5.7 | 5.5 | 9,900 | 2 |
| C | 5.70 | 5.7 | | 0 | 0 | or the solid form may be used so long as there is sufficient water present in the concentrated enzyme preparation to at least substantially dissolve the salts.

All the calcium necessary to achieve the desired calcium level may be provided by the calcium salts of the present invention; namely, calcium lactate, formate, propionate, and acetate. However, other calcium salts may be used, for instance, calcium chloride, to provide a portion of the necessary calcium but in no event should amounts of these other salts be used which will provide greater than one percent calcium in the amylase preparation; and, generally, when these other calcium salts are used it is desirable to use significantly lesser amounts thereof.

Enzyme preparations at relatively low dry substance concentrations are prone to undergo excessive pH drift during storage which is usually ascribed to microbiological activity occuring in the preparation. This effect of pH drift is extremely undesirable and detrimentally affects the activity of the enzyme to a significant degree. Because the calcium salts of the present invention may be incorporated into the enzyme preparation at high levels without detrimentally affecting the activity of the enzyme, the pH of the preparation during storage will be relatively stable.

In order to more clearly disclose the nature of the present invention, specific examples will hereinafter be described. It should be understood, however, that this is done solely by way of example and is intended neither to delineate the scope of the invention nor limit the ambit of the appended claims. In the examples and throughout this specification the percentages are intended to refer to percent by weight, unless otherwise specified.

EXAMPLE I

This example shows the detrimental effects of calcium chloride at concentrations above about one percent calcium in alpha-amylase preparations. It shows that the effect due to calcium chloride is independent of alpha-amylase concentration.

Culture broth (460.5 pounds) from submerged fermentation of *B. subtilis* was treated with 9.67 pounds of calcium chloride dihydrate and 4.6 pounds of borax. The pH of the broth was adjusted to 6.7 with 500 ml. of contrated ammonium hydroxide diluted with 500 ml. of water. One and fifteen hundredths of a pound of sodium hydrosulfite and about 28 pounds HyFlo SuperCel (manufactured by Johns Manville), were then added. This defected broth was filtered on a plate and frame filter press to obtain a clear filtrate. The potency of the filtrate was 4,208 liquefons/gm. and it contained 0.012 gms. calcium/100 gms. This sample is numbered one in Table I.

Using this filtrate three samples were prepared by adding a sufficient amount of calcium chloride dihydrate thereto to achieve the levels shown in Table I. These samples are numbered two, three, and four in Table I. After the additional calcium chloride was added, the enzyme preparations were again adjusted to pH 5.7 and filtered to obtain clear filtrates. Other samples were prepared from the four preceding samples by concentrating under vacuum at approximately 110° F. in a rotary vacuum evaporator.

Note from Table I that the sample containing 5.7 grams of calcium per 100 g. of preparation showed no alpha-amylase activity. Also, from the results shown in the table, it is apparent that the activity of the enzyme after storage decreased as the calcium chloride content was increased. The decreases in activity of samples 1, D1, 2, 3, and 4 were greater than expected and believed to be due to microbiological activity of these samples indicated by the pH change after the samples were stored.

EXAMPLE II

Effect of calcium chloride on activity recovery after calcium enrichment of concentrated enzyme preparation Fermentor broth (6528 gal.) at 3430 Liquefons/ml. was cooled to 70° F. and 1300 pounds calcium chloride dihydrate, dissolved in water to give an 18 percent solution, was added. The pH was adjusted to 5.6 with ammonium hydroxide (28 percent NH₃) and 100 pounds sodium hydrosulfite dissolved in sufficient water was added followed by the addition of 1950 g. sorbic acid dissolved in concentrated ammonium hydroxide. The pH was readjusted to 5.6 with concentrated ammonium hydroxide to give a total of about 150 pounds of concentrated ammonium hydroxide added for all pH adjustments. The broth was filtered through a precoat filter and concentrated by vacuum evaporation at 100–110° F. to 21° Bé. with constant pH adjustment to maintain the pH in the range of 5.2 to 5.8.

To 100 g. of the above described concentrated *B. subtilis* enzyme preparation (15,344 Liquefons/g. and about 1 g. Ca./100 g.) at pH 5.55 and 25° C., various amounts of calcium chloride at various concentration levels were added. The samples were sealed and analyzed within 24 hours to give the results shown in Table II.

TABLE II

| Sample | Calcium salt concentration (C) percent | Weight (W) of calcium solution, g. | Activity recovery, percent |
|---|---|---|---|
| 1 | 52 | 22.8 | 96.3 |
| 2 | 75 | 22.8 | 91.3 |
| 3 | 100 | 22.8 | 86.3 |
| 4 | 45 | 15.5 | 96.7 |
| 5 | 72 | 10.0 | 98.1 |
| 6 | 100 | 15.5 | 91.4 |
| 7 | 23 | 29.8 | 101.2 |

As seen from this table the higher the concentration of calcium chloride solution added the greater the loss of enzyme activity. Also, the more calcium solution added the greater the loss of enzyme activity.

EXAMPLE III

Effect of calcium nitrate on activity recovery after calcium enrichment of concentrated enzyme preparation To 100 g. of a concentrated B. Subtilis enzyme preparation described in Example II (15,344 Liquefons/g. and about 1 g. Ca./100 g.) at pH 5.55 and 25° C., was added 22.8 gms. of 84 percent (by weight) solution of calcium nitrate. The mixture was sealed and analyzed within 24 hours to give the following results: calcium content 4.1 g. Ca./100 g., potency 7705 Liquefons/g. (62 percent recovery), pH 5.0.

EXAMPLE IV

Effect of certain organic calcium salts on activity recovery after calcium enrichment of concentrated enzyme preparation To 200 g. of concentrated B. subtilis enzyme preparation (9839 Liquefons/g. and about 1 percent by weight calcium supplied by calcium chloride) at 25° C. was added various amounts of calcium salts of the present invention and other calcium salts to achieve a final calcium level shown in Table III. The pH of the samples was adjusted to about 5.6. These samples were analyzed for activity after the calcium enrichment. The samples were sealed and analyzed within 24 hours. The results of analysis are given below in Table III.

of HyFlo SuperCel (manufactured by Johns Manville). A pH of 6.0 to 6.5 was maintained through all steps with dilute HCl or ammonium hydroxide. Each of the four samples was vacuum evaporated at 110° F. to about 10,000 liquefons/g. The potencies and calcium contents were determined and the amounts of calcium necessary to enrich 150 g. of the concentrate to a level of about 3 mg./1000 liquefons was calculated for each salt and added to the apropriate sample which had been defecated with that particular salt. Since the lactate is soluble only to a concentration of about 1 percent, a target of 1 mg. calcium/1000 liquefons was used and a control with calcium chloride, Sample 5, at the same level was prepared. All samples were adjusted to pH 5.6, sealed, and analyzed within 24 hours to give the results presented in the following table.

The preparations made with formate, acetate, and lactate showed much better stability than those made with chloride with retained activities of from 87.2 to 93.6 percent after storage. The result of the experiment is shown in Table IV.

TABLE IV

| | | Defecation | | | Calcium enrichment | | |
|---|---|---|---|---|---|---|---|
| Sample | Calcium salt | Calcium content defecated and filtered broth | Potency after concentration, liq./g. | Calcium content after concentration, percent | Calcium, percent | Potency, liq./g. | Storage stability,[1] percent activity retained |
| 1 | Formate | 0.060 | 10,890 | 0.113 | 2.65 | 8,702 | 88.1 |
| 2 | Acetate | 0.069 | 10,184 | 0.118 | 2.62 | 8,171 | 93.6 |
| 3 | Chloride | 0.062 | 11,661 | 0.111 | 2.68 | 8,615 | 54.9 |
| 4 | Lactate | 0.104 | 10,875 | 0.166 | [2] 0.867 | 9,350 | 87.2 |
| 5 | Chloride | 0.062 | 11,661 | 0.111 | [2] 0.943 | 9,247 | 59.5 |

[1] Stored for 28 days at 100° F.
[2] Solubility limit for calcium lactate. For comparison calcium chloride prepared at same level.

The terms and expressions which have seen employed are used as terms of description and not of limitation; and it is not intended in the use of such terms and expressions to exclude any equivalents of the features shown and described or portions thereof, since it is recognized that various modifications are possible within the scope of the invention claimed.

What is claimed is:

1. An aqueous alpha-amylase preparation comprising a sufficient amount of alpha-amylase to provide an activity of above about 3,000 liquefons per gram of preparation and above about one percent calcium by weight, the amount of calcium present above one percent being furnished by a calcium salt selected from the group consisting of calcium acetate, calcium formate, calcium propionate, calcium lactate, and mixtures thereof.

2. An alpha-amylase preparation as defined in claim 1, wherein the alpha-amylase is bacterial alpha-amylase.

3. An alpha-amylase preparation as defined in claim 2, wherein substantially the total amount of calcium present is derived from calcium formate.

4. An alpha-amylase preparation as defined in claim 2, wherein the preparation is a concentrate and has activity

TABLE III

| Sample | Calcium salt | Calcium content, percent | potency, liq./g. | Activity retained after calcium enrichment, percent | Storage stability,[1] percent activity retained |
|---|---|---|---|---|---|
| 1 | Formate | 2.64 | 9,222 | 96.6 | 79.8 |
| 2 | Acetate | 2.69 | 9,293 | 98.9 | 84.6 |
| 3 | Propionate | 2.64 | 9,141 | 98.9 | 83.8 |
| 4 | Chloroacetate | 2.57 | 8,929 | 98.4 | 0 |
| 5 | Chloride | 2.68 | 8,736 | 92.3 | 70.8 |

[1] Stored for 28 days at 100° F.

EXAMPLE V

Effect of organic calcium salt on enzyme stability when used for defecation and calcium enrichment of enzyme concentrate To each of four 2000 g. aliquots of fermentor broth, 0.52 percent by weight of calcium was added as the solid salt using one of the following: calcium chloride—39.75 g., calcium formate—35.1 g., calcium acetate—42.55 g., calcium lactate—80.03 g. Three grams sodium hydrosulfite dissolved in a minimum of water was added to each sample. Sorbic acid (0.04 percent by weight) dissolved in concentrated ammonium hydroxide was added to each sample which was then filtered by vacuum through a mat of between about 8000 and 12,000 liquefons per gram of concentrate.

5. An alpha-amylase preparation as defined in claim 2, wherein substantially the total amount of calcium present is derived from a calcium salt selected from the group consisting of calcium acetate, calcium formate, calcium propionate, calcium lactate, and mixtures thereof.

6. An alpha-amylase preparation as defined in claim 2, wherein the amount of calcium is between about above one percent and below about 5 percent.

7. A method of preparing an aqueous bacterial alpha-amylase preparation which comprises defecating a *B. subtilis* fermentation broth and incorporating into the defecated preparation an amount of a calcium salt selected from the group consisting of calcium lactate, calcium acetate, calcium formate, calcium propionate, and mixtures thereof sufficient to provide in the preparation above one percent calcium.

8. A method of preparing an aqueous bacterial alpha-amylase preparation as defined in claim 7 which comprises defecating a *B. subtilis* fermentation broth with sufficient calcium salt selected from the group consisting of calcium acetate, calcium formate, calcium propionate, calcium lactate, and mixtures thereof to provide a calcium content in the defecated preparation above one percent calcium.

References Cited
UNITED STATES PATENTS

| | | | |
|---|---|---|---|
| 2,153,445 | 4/1939 | Willaman et al. | 195—114 |
| 3,031,380 | 4/1962 | Minagawa et al. | 195—66 |

LIONEL M. SHAPIRO, Primary Examiner

U.S. Cl. X.R.

195—31, 68